United States Patent [19]

Griffin

[11] 4,203,242

[45] May 20, 1980

[54] SIGN STANDARD

[76] Inventor: Kenneth E. Griffin, 6304 - 204th SW., Lynnwood, Wash. 98036

[21] Appl. No.: 967,113

[22] Filed: Dec. 7, 1978

[51] Int. Cl.² .................. F16M 11/10; F16M 11/16
[52] U.S. Cl. ...................................... 40/610; 248/168
[58] Field of Search ................... 40/606, 610, 612; 248/168, 166, 463

[56] References Cited

U.S. PATENT DOCUMENTS

| 377,629 | 2/1908 | Macke, Jr. | 248/462 |
|---|---|---|---|
| 1,746,868 | 2/1930 | Procter | 248/166 |
| 2,356,532 | 8/1944 | Rapfogel | 248/462 |
| 2,670,918 | 3/1954 | Kinnard | 248/168 |
| 2,896,891 | 7/1959 | Ernst | 248/168 |
| 2,941,774 | 6/1960 | Metear | 248/463 |
| 2,995,847 | 8/1961 | Carpenter | 248/166 |
| 3,114,529 | 12/1963 | Mills | 248/168 |
| 3,591,116 | 7/1971 | Dalum | 248/166 |
| 3,677,511 | 7/1972 | Dicke | 40/610 |

FOREIGN PATENT DOCUMENTS 750562 8/1933 France ........................................ 40/610
818475 9/1937 France ........................................ 40/610

Primary Examiner—Russell R. Kinsey
Assistant Examiner—Paul J. Hirsch
Attorney, Agent, or Firm—Graybeal & Uhlir

[57] ABSTRACT

Sign standard comprising two oppositely formed front legs interconnected at their upper ends with a rearwardly disposable third leg through the use of an arcuate joiner means. Each of the two front legs includes a minor upper section which is laterally, angularly disposed with respect to a major lower section. The arcuate joiner means is fixedly attached to the upper end portion of the third leg from which leg said joiner means extend laterally in opposite directions and extend through transverse openings provided in the upper portions of the two front legs. The two front legs and the arcuate joiner means cooperate together to permit the sign standard to assume an open position wherein the lower ends of all three legs are spaced apart relative to each other and to assume a closed position wherein the three legs are in closely adjacent, aligned relationship. Furthermore, means are provided for supporting a diamond shaped sign mounted on the two front legs.

13 Claims, 7 Drawing Figures

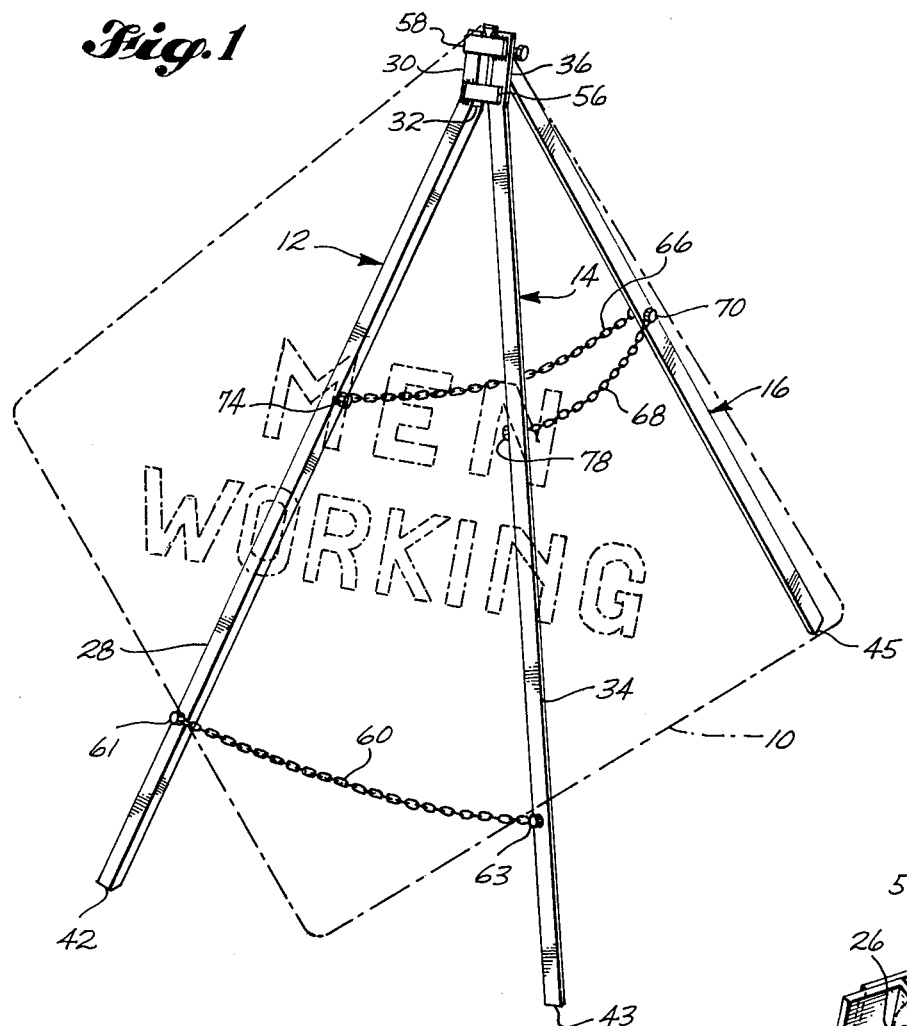

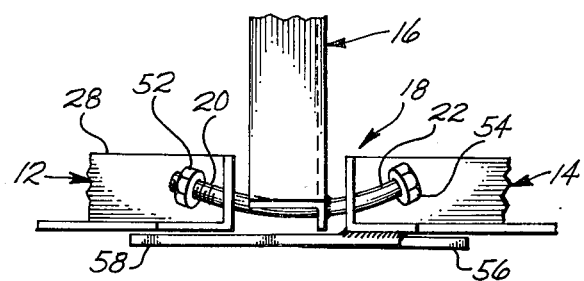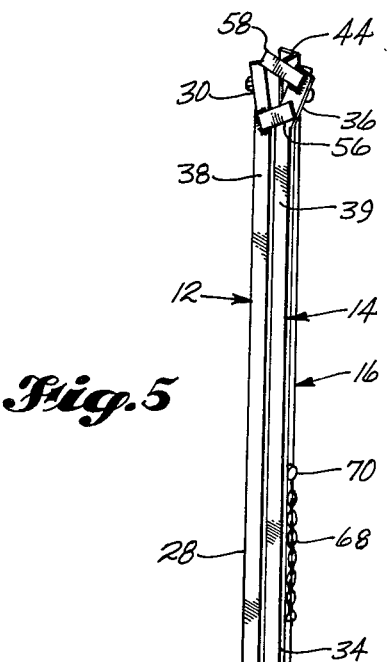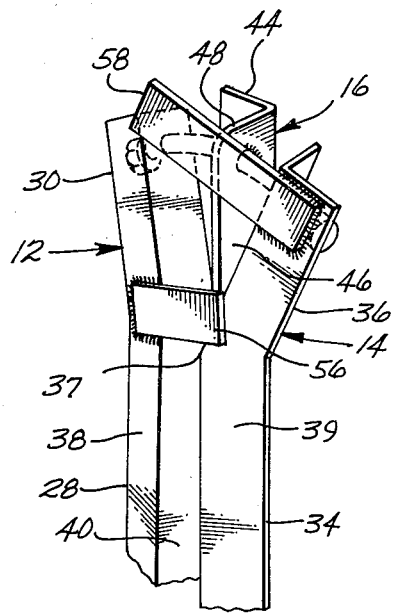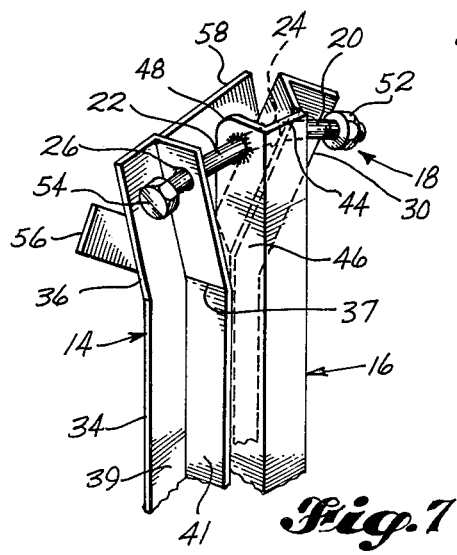

SIGN STANDARD

BACKGROUND OF THE INVENTION

1. Field of the Invention

The present invention relates to an apparatus for supporting a sign. More particularly, it relates to a collapsible sign stand which can be quickly and easily set up to support highway warning signs and which can be collapsed into a compact bundle for convenient storage and transportation.

2. Description of the Prior Art

Signs are often temporarily set up to provide motorists with information and warnings, especially during highway construction and repairs and during various emergency situations such as when a road becomes washed-out or when an automobile accident occurs. It is desirable that the supports for these types of outdoor signs be collapsible so that they can be conveniently transported without occupying a large volume of space while also being easily and quickly set up by a workman. Furthermore, the sign stand should be rugged enough to withstand adverse weather and stable enough not to be blown over by the wind or by passing vehicles. Furthermore, it is desirable that the stand be capable of withstanding the rough handling generally associated with equipment used in highway construction.

Known supports for highway stands include the type disclosed in Dalum U.S. Pat. No. 3,591,116, namely a stand constructed generally of a pair of laterally spaced apart vertical legs interconnected at their lower ends by a horizontal bar. A pair of opposed feet extend forwardly and rearwardly from the bottom of each of the two vertical legs to maintain the sign stand in upright position. To enable the sign stand of Dalum to be collapsed, the vertical legs, horizontal bar, and horizontal feet are all pivotally interconnected through the use of spring-loaded joints. Not only is this type of construction expensive, but springs are a common cause of failure, due to fatigue and corrosion, especially when used in outdoor applications. Furthermore, the four horizontal feet of this type of stand cannot properly support the stand if the underlying ground is uneven.

A stand which permits a highway sign to swing fore and aft is disclosed by Dicke U.S. Pat. No. 3,677,511. This stand is constructed of a stationary A-frame which resembles a common sawhorse. A swinging subframe is pivotally mounted between the legs of the A-frame, which subframe includes an upwardly extendable mast for supporting the upper end of a sign. Extension springs are interconnected between the A-frame and swinging subframe to maintain the subframe and mast nominally vertical. This particular sign stand construction, requiring many components, is not only expensive to construct, but also results in a very heavy frame which is difficult for a single workman to handle. Furthermore, this particular sign stand cannot be collapsed in the compact manner of the present invention.

Carpenter U.S. Pat. No. 2,995,847 also concerns a swinging sign stand which incorporates a stationary A-frame resembling a sawhorse. However, the swinging portion of the sign stand of Carpenter does not include an upwardly extendable mast nor extension springs which interconnect the swinging and stationary portions of the frame to maintain the sign in nominally vertical position.

Various types of three-legged supporting devices are also known. One such device is illustrated in FIGS. 1–3 by Proctor U.S. Pat. No. 1,764,868 which involves a stand for supporting harvested flax and grains in the shape of a rick or stack for drying. The stand of Proctor is constructed of three straight legs which are pivotally interconnected at their upper ends to form a tripod. However, to permit the legs to be properly spread out and to be collapsed in a more compact manner, the interconnecting bolt must be so loose that the stand would tend to tip over in the blowing wind. Thus, either triangular hoops to surround the three legs, or, alternatively, horizontal cross bars to interconnect the legs, are provided to stabilize the three legs.

A three-legged device for supporting cameras and surveying instruments is disclosed by Mills U.S. Pat. No. 3,114,529. Each of the three legs has a perpendicularly disposed disc attached to its upper end portion and wedge-shaped spacers are sandwiched between adjacent leg discs. The three legs and two spacers are simultaneously pivotable about a bent bolt which extends through central holes provided in each leg disc and each spacer. A wing nut is provided to engage the threaded end of the bolt to clamp the three leg discs and two spacers together in selected positions. As apparent, this particular type of supporting device not only requires precisely manufactured components but also is limited in its ability to support loads by the amount of clamping force which can be generated by tightening the wing nut. Furthermore, exposure to the weather will cause corrosion in the threads of the bolt making it difficult to tighten and loosen the wing nut.

Also of interest in the field of supporting devices are Macke, Jr. U.S. Pat. No. 377,629, and Rapfogel U.S. Pat. No. 356,532, both of which involve foldable music stands. Both stands include a back rest for supporting sheet music constructed of links pivotally interconnected in the form of "lazy tongs". A rearwardly extending brace is pivotally interconnected to an upper portion of the back rest for maintaining said back support in upright position. These two music stands also include members extending horizontally from a bottom portion of the back rest for supporting the bottom edge of the sheet music. While these types of stands may be adequate for supporting lightweight sheet music, they are not rugged enough to support large, heavy highway signs.

SUMMARY OF THE INVENTION

The present invention relates to a novel standard which is particularly useful for supporting highway signs. In basic form the standard is composed of first and second oppositely formed front legs, each having a major lower section and a minor upper section which extend oppositely downwardly and upwardly, respectively, and laterally outwardly from a medial juncture. A rearwardly pivotable third leg is disposed between the first and second legs. Joiner means in the form of at least one arcuate rod interconnect the upper end portions of the three legs, which joiner means is fixedly attached to one of the three legs while the remaining two legs have transverse openings in their upper end portions for slidably receiving the joiner means. Furthermore, means are provided for supporting a sign mounted on the first and second legs.

In use, the arcuate rod slides lengthwise through the transverse openings provided in the upper end portions of the legs to permit the sign standard to shift between an open, sign supporting position and closed or retracted position. When in closed position, the lower sections of the first and second leg are aligned adjacent to each other while the third leg is disposed therebetween. Correspondingly, the upper sections of the first and second legs then extend upwardly and oppositely, laterally outwardly with respect to each other. To shift to the open position, the upper sections of the first and second legs are drawn inwardly until they are aligned adjacent each other with the upper portion of the third leg disposed therebetween. Correspondingly, the lower sections of the first and second legs then extend downwardly and oppositely, laterally outwardly while the lower portion of the third leg extends rearwardly of the first and second legs.

A cross member is fixedly attached to at least one of the first and second legs to cantilever laterally across to bear against the other of the first and second legs to thereby restrain both first and second legs from rotating about their respective longitudinal axis when in open position.

It is a principal object of the present invention to provide a sign standard which can be readily retracted or closed to form a compact bundle for convenient storage and transportation, and which can be rapidly and easily extended or opened by a single workman, all without need for installation or adjustment of any parts of the standard.

Another object of the present invention is to provide a sign standard which can be opened up and made stable without having to tighten or loosen any hardware.

An additional object of the present invention is to provide a sign standard wherein signs are mounted on the standard and wherein different signs can be easily substituted for each other without having to engage or disengage any fasteners.

Still another object of the present invention is to provide a sign standard which is not only rugged and durable, but also light enough to be easily carried by a single workman.

A further object of the present invention is to provide a sign standard which is stable enough not to be tipped over by the blowing wind.

Yet another object of the present invention is to provide a sign standard which can be simply and inexpensively constructed from a minimum of commonly available structural components.

BRIEF DESCRIPTION OF THE DRAWINGS

FIG. 1 is an isometric view of an embodiment of the present invention, shown in open position and supporting a diamond-shaped highway sign which is shown in broken line;

FIG. 2 is a front fragmentary isometric view which is enlarged to specifically illustrate the relationship of the components of the present invention when in open position;

FIG. 3 is a rear fragmentary isometric view which is also enlarged to specifically illustrate the relationship of the components of the present invention when in open position;

FIG. 4 is an enlarged fragmentary plan view illustrating the relationship of the components of the present invention when in open position;

FIG. 5 is a front isometric view illustrating the components of the present invention retracted to a closed position;

FIG. 6 is a fragmentary front isometric view which is enlarged to further illustrate the interrelationship of the components of the present invention when in closed position; and FIG. 7 is a fragmentary rear isometric view which is enlarged to further illustrate the relationship of the components of the present invention when in closed position.

DESCRIPTION OF THE PREFERRED EMBODIMENT

Referring initially to FIG. 1, shown supporting a diamond shaped sign 10 is a typical sign standard constructed according to the present invention. In the preferred form illustrated, it comprises elongate, oppositely formed, first front leg 12 and second front leg 14, and a straight third leg 16 which is disposed rearwardly of said front legs 12 and 14. As most clearly shown in FIGS. 2-4, 6 and 7, the three legs 12, 14 and 16 are interconnected at their upper end portions by joiner means 18 in the form of oppositely disposed first and second arcuate rods 20 and 22, respectively, which rods are fixedly attached at their adjacent inner end portions to third leg 16. First rod 20 is slidably engageable through hole or opening 24 in first leg 12 while second rod 22 is slidably engageable through second hole or opening 26 in second leg 14. As thusly constructed, the sign standard of the present invention can be shifted between an open or extended position for supporting sign 10, as shown in FIGS. 1-4, and a closed or retracted position as shown in FIGS. 5-7.

Now referring specifically to FIGS. 2, 3, 6 and 7, first front leg 12 is illustrated as constructed of an elongate, major lower section 28 and a much shorter upper minor section 30 which two sections are laterally angularly disposed relative to each other to form an obtuse dihedral angle about an inwardly directed corner or apex 32. Second leg 14 includes an elongate, major lower section 34 and a substantially shorter minor upper section 36 which two sections are laterally angularly disposed in a manner oppositely of first leg 12. Lower section 34 and upper section 36 form an obtuse dihedral angle about an inwardly directed corner or apex 37.

When formed legs 12 and 14 are in open position as shown in FIGS. 1 and 3, their respective upper sections 30 and 36 are in adjacent aligned relationship while their respective lower sections 38 and 34 extend downwardly and oppositely, laterally outwardly relative to each other. However, the sign standard of the present invention can function properly even if upper sections 30 and 36 are in the spaced aligned relationship of FIGS. 2 and 4. Correspondingly, when first leg 12 and second leg 14 are in closed position, as shown in FIGS. 5-7, their respective lower sections 28 and 34 are in aligned, closely adjacent relationship while their respective upper sections 30 and 36 extend upwardly and oppositely, laterally outwardly relative to each other.

As illustrated, both first leg 12 and second leg 14 are constructed from angle bars, commonly known as "angle iron". Said legs 12 and 14 are oriented to have transversely directed front flanges 38 and 39, respectively, which two flanges are disposed coplanar to thus provide a flat surface against which the back of sign 10 can securely rest. The second flanges 40 and 41 of first and second legs 12 and 14, respectively, extend rearwardly from the corresponding adjacent or inwardly directed edges of said lateral flanges 38 and 39.

Rather than being constructed from angle bars, legs 12 and 14 can be made from structural components having other cross-sectional shapes such as round or square. Furthermore, instead of being constructed of such a round or square bar members, legs 12 and 14 can alternatively be made from tubing of various cross-sectional shapes.

The lower sections 28 and 34 of first and second legs 12 and 14, respectively, are each illustrated as being of a unitary member. However, lower sections 28 and 34 could as well be constructed of a plurality of members which telescope lengthwise relative to each other to thus permit legs 12 and 14 to assume an extremely compact form when in closed position. Various types of telescoping legs are well-known per se, especially telescoping legs constructed of tubular segments.

Also, if desired, the bottom end portions 42 of first leg 12 and 43 of second leg 14 can be provided with horizontal pads or feet (not shown) to prevent or minimize the sinking of said legs into soft ground. Alternatively, lower end portion 42 of first leg 12 and lower end portion 43 of second leg 14 can be pointed to facilitate the driving of said legs into the ground, if desired.

Referring specifically to FIG. 1, third leg 16 is there illustrated as being an elongate, substantially straight member which is pivotally interconnected at its upper end portion 44 to first leg upper section 30 and to second leg upper section 36 through the use of joiner means 18. When in open position, third leg 16, as shown in FIGS. 1–3, is disposed rearwardly of first and second legs 12 and 14 respectively. When in closed position, however, third leg 16, as shown in FIGS. 5–7, is aligned with and disposed between first and second legs 12 and 14 respectively, to therewith form an extremely compact bundle.

Because it is desirable that all three legs 12, 14 and 16 be constructed from structural components of the same shape and size, third leg 16 is also shown as being made from "angle iron". However, as previously discussed in relation to first and second legs 12 and 14, respectively, third leg 16 can also be constructed from structural components of other types and shapes, such as round or square bars or tubes. Furthermore, the lower end portion 45 of third leg 16 can also be provided with a horizontal pad or foot (not shown) or shaped to a point to correspond to the lower end portions 42 and 43 of first and second legs 12 and 14, respectively.

Joiner means 18, as most clearly depicted in FIGS. 2–4, 6 and 7, includes first and second, laterally directed, arcuate rods 20 and 22, respectively. Said rods 20 and 22 are preferably of circular cross-section and are fixedly attached at their adjacent inner end portions to the upper end portion of longitudinal flange 46 of third leg 16. First and second rods 20 and 22 each cantilever laterally from flange 46, thereby forming a downwardly open arc. An opening or hole 24 is provided in transverse flange 38 of first leg upper section 30 for slidably receiving first rod 20 therethrough as first leg 12 and second leg 14 are shifted between the open position shown in FIGS. 1–4 and the closed position shown in FIGS. 5–7. Correspondingly, a hole or opening 26 is provided in the transverse flange 39 of second leg upper section 36 for slidably receiving second rod 22 therethrough as first leg 12 and second leg 14 are shifted between the open position shown in FIGS. 1 and 4 and the closed position shown in FIGS. 5–7. Furthermore, rods 20 and 22 rotate about their respective longitudinal axes within holes 24 and 26, respectively, when third leg 16 is pivoted forwardly into closed position and rearwardly into open positions. As shown in FIGS. 2 and 3, the upper corner 48 of third leg longitudinal flange 46 is rounded or radiused to clear the rear surface of second cross member 58.

The free end portion of first rod 20 is provided with a first stop means in the form of nut 52 to prevent first leg 12 from being slidably disengaged from said first rod 20. Correspondingly, the free end of second rod 22 is provided with stop means in the form of head 54 to prevent second leg 14 from slidably disengaging from said second rod 14. Furthermore, both first rod 20 and second rod 22 are of sufficient length to permit first leg 12 and second leg 14, respectively, from freely assuming their closed position without nut 52 impinging against longitudinal flange 38 or head 54 impinging against longitudinal flange 39.

Rather than utilizing nut 52 or head 54, stop means for the free end portions of rods 20, 22 can be of other well-known forms, such as of a flat washer which is retained engaged over the free end portions of each of said two rods by cotter pins extending through holes cross drilled in the outer end portions of said two rods.

Furthermore, rods 20 and 22 need not necessarily be circular in cross-section; however, by being of circular cross-section said rods are free to rotate within respective openings 24 and 26 when third leg 16 is pivoted between its open position, FIGS. 1–4, and its closed position, FIGS. 5–7.

It is to be appreciated that rods 20 and 22 not only maintain legs 12, 14 and 16 interconnected, but also permit said three legs to freely shift between their open and closed positions. This is accomplished by making the curvature of rods 20 and 22 approximately correspond to the respective arcs defined by openings 24 and 26 as first leg 12 and second leg 14 are pivoted about their respective apexes 32 and 38, which each bear against the opposite surfaces of longitudinal flange 46 of third leg 16 as said two legs are shifted between the open position of FIGS. 1 and 3 and the closed position of FIGS. 5–7. Furthermore, because the free ends of rods 20 and 22 extend downwardly, legs 12 and 14 when in open position naturally slide inwardly along respective arced members 20 and 22 until the longitudinal flanges 40 and 41 of said two legs are locked against the opposite sides of third leg 16 as shown in FIGS. 1 and 3. This inwardly biasing of first and second legs 12 and 14 results in the sign standard of the present invention naturally tending to seek and maintain a rigid, open position, without having to resort to the use of additional hardware or any adjustment of parts such as lock nuts.

It is to be appreciated that rather than utilizing two rods 20 and 22 which extend in generally opposite directions from third leg 16, a single arcuate rod (not shown) of a shape corresponding to the combination of rods 20 and 22 can be fixedly attached to either first leg 12 or second leg 14. Then transverse openings can be provided in the other of said first and second legs and also in third leg 16 to permit the sign standard to shift between its open and closed positions.

Referring now to FIGS. 1–3, a first cross member in the form of a rectangularly shaped flat bar 56 is shown fixedly connected at one end of the front surface of the transverse flange of the first leg 12 near the juncture of lower section 28 and upper section 30. First cross member 56 cantilevers laterally to overlap the adjacent portion of the front surface of transverse flange 39 of second leg 14 and then extends beyond said second leg 14 when upper sections 30 and 36 are in the closely spaced position of FIG. 3. Second leg 14 is provided with a second cross member 58 which is fixedly attached at one end to the front surface of upper section 36 of said second leg 14 at an elevation above first cross member 56. Said second cross member 58 is cantilevered from said second leg 14 to extend laterally across to overlap the front surface of upper section 30 of first leg 12 and then extends beyond said first leg 12 when upper sections 30 and 36 are in closely spaced relationship as shown in FIG. 3.

When the sign standard of the present invention is in open position, first and second cross members 56 and 58, respectively, function to prevent first leg 12 and second leg 14 from rotating relative to each other about their respective longitudinal axis to thus ensure that the transverse flanges 38 and 39, respectively, or first leg 12 and second leg 14 lie on a common plane to thereby stabilize the legs and provide a flat, stable back support for sign 10. Furthermore, first and second cross members 56 and 58, respectively, are spaced vertically apart a distance far enough and are each short enough to permit first and second legs 12 and 14 to freely assume the closed position shown in FIGS. 5 and 7 without interfering with each other.

Methods for preventing first leg 12 and second leg 14 from rotating about their respective longitudinal axis while enabling said two legs to shift between closed and open positions other than using cross members 56 and 58 can be provided. However, it is to be appreciated that first cross member 56 and second cross member 58 perform these functions simply and with a minimum of expense while not requiring tightening or loosening of any hardware.

Referring next to FIG. 1, a first flexible line in the form of first chain 60 is provided to limit the relative angular displacement of lower section 28 of first leg 12 and lower section 34 of second leg 14. One end of chain 60 is connected to the transverse flange portion 38 of lower section 28 by connector means in the form of conventional, well-known fastener means, such as cap screw 61 which extends through a hole provided in said lower section 28 and engages nut 62. The opposite end of said chain 60 is likewise connected to the transverse flange portion of lower section 34, also by connector means in the form of conventional, well-known fastener means such as cap screw 63 which extends through a hole provided in said lower section and engages nut 64. Rather than using cap screws 61, 63 and nuts 62, 64 to attach chain 60 to first and second legs 12 and 14, respectively, said chain could be welded directly to said two legs. In addition to limiting the relative angular displacement between lower sections 28 and 34, chain 60 also functions as supporting means to support sign 10 against the transverse flanges 38 and 39 of first and second legs 12 and 14, respectively.

It is to be understood that other flexible line members, such as wire rope, can be substituted for chain 60. Furthermore, chain 60 can be replaced by a two-piece bar which could be provided to pivot or fold to permit first leg 12 and second leg 14 to shift between their closed and opened positions.

A pair of flexible line members in the form of second chain 66 and third chain 68 are provided to limit the rearwardly angular displacement of third leg 16 with respect to first and second legs 12 and 14. One end of each of said chains 66 and 68 is connected to a medial portion of third leg 16 through the connector means in the form of conventional hardware such as cap screw 70 which extends through a hole provided in third leg longitudinal flange 46 to engage with nut 72. The opposite end of one of said chains is connected to a medial portion of longitudinal flange 40 of lower section 28 by connector means in the form of cap screw 74 which extends through a hole provided in said lower section 28 to engage with nut 76 while the opposite end of the other chain is connected to the medial portion of the longitudinal flange 41 of lower section 34 through the use of connector means in the form of cap screw 78 which extends through a hole provided in said lower section 34 to engage with nut 80. As with first chain 50, second and third chains 66 and 68 can also be attached to legs 12 and 14 by welding said chains directly to said legs 12 and 14.

Chains 66 and 68 can also be replaced by other flexible line members, such as wire rope. Furthermore, as with first chain 60, second and third chains 66 and 68 could also be replaced by a two-piece, pivoting bar.

To retract the sign stand shown in FIG. 1, sign 10 is first lifted upwardly away and removed from chain 60 and first and second legs 12 and 14, respectively. Third leg 16 is then pivoted forwardly about its upper end portion 44 to lie lengthwise between first and second legs 12 and 14. Next, the lower sections 28 and 34 of first and second legs 12 and 14, respectively, are simply pivoted towards each other about respective apexes 32 and 37 to assume the extremely compact form shown in FIG. 5.

As can be seen in FIGS. 5-7, when legs 12 and 14 are in closed position, upper sections 30 and 36, respectively, extend upwardly and oppositely laterally away from each other. However, since upper sections 30 and 36 are relatively short in comparison to lower sections 28 and 34, said upper sections do not compromise the compactness of the sign stand of the present invention when in closed position.

To extend or open the present sign stand, lower sections 28 and 34 of first and second legs 12 and 14, respectively, are pulled apart until first chain 60 is taut, as shown in FIG. 1. In this configuration, preferably upper sections 30 and 36 of said two legs are aligned closely adjacent to each other, being separated only by the width of third leg 16. Next, third leg 16 is pivoted rearwardly about rods 20 and 22 until second and third chains 66 and 68 are taut.

Lastly, sign 10 is simply placed against the front surfaces of first and second legs 12 and 14 and then is lowered until restrained and supported by chain 60 and cap screws 61 and 63. In this position, sign 10 is securely locked in place between first chain 60 and first and second legs 12 and 14. Moreover, the weight of sign 10 provides a laterally outwardly directed force at the intersection of leg 12 and first chain 60 and at the intersection of leg 14 and chain 60 to maintain said two legs spread apart. Furthermore, the upper end portion of sign 10 is tilted rearwardly to bear against the front surface of cross members 56 and 58 which cross members in turn bear against the transverse flanges 38 and 39 of first and second legs 12 and 14, respectively, to prevent said two legs from rotating about their respective longitudinal axis. Thus it can be seen that the sign standard of the present invention cooperates with sign 10 itself to form a rigid, stable combination when said sign standard is in open position.

What is claimed is:

1. A portable, retractable sign standard comprising:
   (a) a formed first leg having a major lower section and a minor upper section, said two sections being angularly disposed relative to each other about a first medial juncture;

(b) a formed second leg having a major lower section and a minor upper section, said two sections being laterally angularly disposed relative to each other about a second medial juncture in a manner oppositely to said first leg;

(c) a rearwardly positionable third leg disposed between said first and second legs;

(d) arcuate joiner means interconnecting said three legs, said joiner means being fixedly attached to the upper end portion of one of said three legs;

(e) transverse openings being defined by the upper end portions of the other two legs for receiving said joiner means;

(f) said joiner means being lengthwise slidable through said two openings to permit said first, second and third legs to shift laterally between:
a closed position wherein said first leg lower section, said second leg lower section and said third leg being aligned adjacent to each other with said third leg being disposed between said first leg lower section and said second leg lower section, and said first leg upper section and said second leg upper section each extending upwardly and oppositely, laterally outwardly from said first and second medial junctures, respectively, and
an open position for supporting a sign wherein said upper sections of said first and second legs being aligned adjacent each other with the upper end portion of said third leg being disposed therebetween, and said lower sections of said first and second legs each extending downwardly and oppositely, laterally outwardly from said first and second medial junctures, respectively, while the lower portion of said third leg extending rearwardly of said first and second legs;

(g) a cross member fixedly attached to one of said first and second legs, said cross member being cantilevered generally laterally from its point of attachment to bear against the other of said first and second legs to restrain said first and second legs from pivoting about their respective longitudinal axis when said first and second legs being in open position; and (h) means for supporting a sign mounted on said first and second legs.

2. The sign standard according to claim 1, wherein said sign supporting means interconnects said first and second legs to also limit laterally outwardly, relative displacement between said lower sections of said first and second legs.

3. The sign standard according to claim 2, wherein said sign supporting means includes a first flexible line having one of its end portions connectable to said lower section of one of said first and second legs and having its opposite end portion connectable to said lower section of the other of said first and second legs.

4. The sign standard according to claim 1, further comprising a cross member fixedly attached to the front surface of an upper portion of each of said first and second legs, each of said two cross members bearing against the corresponding front surface of the other of said first and second legs.

5. The sign standard according to claim 1, further comprising:

a second flexible line having one of its end portions connectable to one of said first and third legs and having its opposite end portion connectable to the other of said first and third legs for limiting the relative angular displacement between said first and third legs; and a third flexible line having one of its end portions connectable to one of said second and third legs and having its opposite end portion connectable to the other of said second and third legs for limiting relative angular displacement between said second and third legs.

6. The sign standard according to claim 1, wherein said joiner means including a single downwardly open, arcuate rod, said rod having one of its end portions fixedly attached to said upper section of one of said first and second legs, and having its free end portion extending laterally for being slidably receivable through said openings provided in the upper end portion of said third leg and in said upper section of the other of said first and second legs.

7. The sign standard according to claim 6, further including stop means at the free end portion of said rod to maintain said first, second and third legs interconnected together.

8. The sign standard according to claim 1, wherein said joiner means including a pair of downwardly open, arcuate rods, each of said two rods being fixedly attached at their adjacent inner end portions to said third leg and each of said two rods extending oppositely, laterally outwardly for being slidably receivable through said openings provided in said upper section of said corresponding first and second legs.

9. The sign standard according to claim 8, wherein said joiner means further includes a stop member at the free end of each of said two arcuate rods, said two stop members preventing said first and second legs from being slidably disengaged from said corresponding arcuate rod.

10. In combination, a sign and a portable sign standard erectable in an open, sign supporting position and retractable to a closed storage position, said sign standard comprising:

(a) a dihedronal first front leg having a major lower section and a minor upper section, said two sections interconnecting each other at a first laterally inwardly corner;

(b) a dihedronal second front leg being formed oppositely to said first front leg, said second leg having a major lower section and a minor upper section, said two sections interconnecting each other at a second laterally inwardly corner;

(c) a rearwardly disposable third leg having its upper end portion positioned between said first and second front legs;

(d) arcuate joiner means fixedly attached to the upper end portion of one of said first, second and third legs for interconnecting said three legs;

(e) transverse openings being defined by the upper end portions of the other two of said legs for slidably receiving said arcuate joiner means therethrough;

(f) said arcuate joiner means being shaped to correspond to the arc defined by said two openings when said first and third legs are pivoted laterally relative to each other between:
said open position wherein said upper sections of each of said first and second legs being aligned adjacent each other with the upper portion of said third leg being sandwiched therebetween, and said lower sections of each of said first and second legs extending downwardly and oppositely, laterally outwardly from said first and second corners, respectively, and said closed position wherein said lower sections of each of said first and second legs being aligned adjacent each other with said third leg being sandwiched therebetween, and said upper sections of each of said first and second legs extending upwardly and oppositely, laterally outwardly from said first and second corners, respectively; and, (g) means for simultaneously supporting said sign against the front surface of both of said first and second legs and limiting the lateral angular displacement between said first and second legs.

11. The combination according to claim 10, further comprising:
(a) a cross member being cantilevered from the front surface of an upper end portion of each of said first and second legs;
(b) the free end portion of each of said cross members extending laterally to bear rearwardly against the front surface of the opposite of said first and second legs when said first and second legs being in open position;
(c) said two cross members providing a bearing surface against which said sign tilts rearwardly against; and
(d) said two cross members cooperating with the sign to prevent said first and second legs from rotating about their respective longitudinal axes.

12. The combination according to claim 10, wherein:
(a) said sign supporting means includes a flexible line and connector means for connecting one end portion of said flexible line to one of said first and second legs and for connecting the opposite end portion of said flexible line to the other of said first and second legs; and,
(b) portions of said sign bearing laterally outward against said sign supporting means to cooperate with said sign standard for maintaining said sign standard in rigid, open position.

13. The combination according to claim 12, wherein said sign is diamond shaped, with the lower adjacent sides thereof contacting said sign supporting means.

* * * * *